J. L. HECHT.
DEMOUNTABLE RIM FOR WHEELS.
APPLICATION FILED JULY 13, 1916.

1,299,463.

Patented Apr. 8, 1919.
2 SHEETS—SHEET 1.

Attest:

Inventor:
J. L. Hecht
by Rogers, Kennedy & Campbell
Attys.

J. L. HECHT.
DEMOUNTABLE RIM FOR WHEELS.
APPLICATION FILED JULY 13, 1916.

1,299,463.

Patented Apr. 8, 1919.
2 SHEETS—SHEET 2.

Attest:

Inventor:
J. L. Hecht
by Rogers, Kennedy & Campbell
Attys.

UNITED STATES PATENT OFFICE.

JOSEPH L. HECHT, OF DAVENPORT, IOWA, ASSIGNOR TO G. WATSON FRENCH, NATHANIEL FRENCH, JOSEPH L. HECHT, AND W. H. STACKHOUSE, ALL OF DAVENPORT, IOWA, COMPOSING THE FIRM OF FRENCH & HECHT, OF DAVENPORT, IOWA.

DEMOUNTABLE RIM FOR WHEELS.

1,299,463.   Specification of Letters Patent.   Patented Apr. 8, 1919.

Application filed July 13, 1916. Serial No. 108,990.

*To all whom it may concern:*

Be it known that I, JOSEPH L. HECHT, a citizen of the United States, residing at Davenport, in the county of Scott and State of Iowa, have invented certain new and useful Improvements in Demountable Rims for Wheels, of which the following is a specification, reference being had therein to the accompanying drawing.

This invention relates to quickly demountable wheel rims, and has reference more particularly to detachable rims carrying rubber tires, the object of the invention being to provide for the fastening of the detachable rim to the fixed rim of the wheel so that there will be no liability of displacement or looseness, and so that the rim may be removed with ease and despatch and replaced, or a new one substituted, with the expenditure of a minimum of labor and time.

The invention is designed particularly with the view to the application of a detachable rim or rims to an all metal wheel in which metal spokes are fastened directly to a metal rim without the intervention of the usual wooden felly characteristic of wooden wheels.

In the application of demountable or detachable rims to wooden wheels provided with wooden fellies and a surrounding tire, it has been proposed to employ between the detachable rim and felly band, fastening members in the form of wedges which when forced axially would wedge between the felly band and detachable rim and firmly bind the detachable rim fixedly in place, clamping members being applied to the wheel to fulcrum on the wooden felly and to engage the fastening members, and through bolts being provided passing through the felly and clamping members and acting when tightened up to force the clamping members toward each other, and thereby cause them to fulcrum on the felly and shift the wedging members axially. Inasmuch as in all-metal wheels of the type to which my invention is particularly applicable, a wooden felly is not employed, and inasmuch as the metal wheel rim is comparatively thin, there is no fulcruming support to sustain the clamping members in their fulcruming action, and to meet this condition my invention consists in the provision of a special fulcruming member or members, independent of and separate from the wheel rim, and so disposed relatively thereto that the clamping members will be given a fulcruming support and may be operated to shift the fastening members axially and thereby bind the detachable rim firmly in place on the fixed rim.

In the more specific embodiment of my invention, the fastening members are in the form of wedge-shaped rings, the clamping members are in the form of clamping rings engaging the wedge-shaped rings, and the fulcruming members are in the form of axially extending bars disposed inwardly of the rim and between the two clamping rings, the said bars and rings being relatively formed so that they will engage each other inward of the points of engagement of the clamping rings with the wedging rings, and through bolts being provided extending through the clamping rings and fulcruming members and being operable to draw the clamping rings together to cause them to fulcrum on the fulcruming members and thereby operate the wedging rings.

Figure 1:
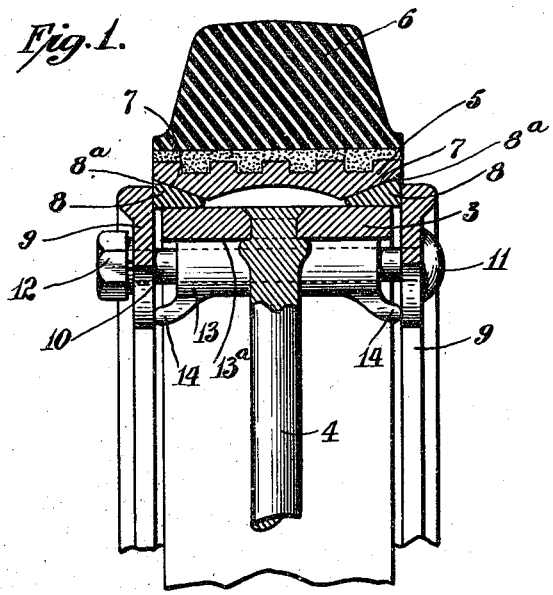
Figure 1 is an axial section through one side of a wheel equipped with a detachable rim and embodying my invention in one form.
Figure 2:
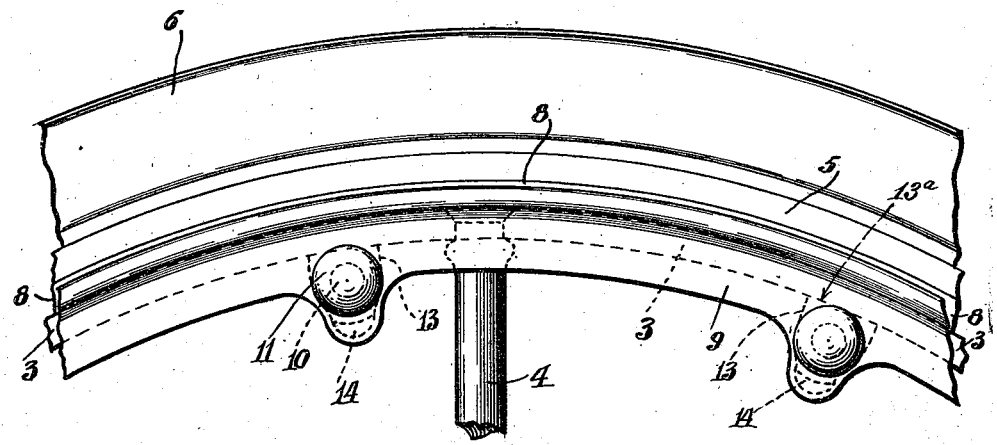
Fig. 2 is a side elevation of the same.
Figure 3:
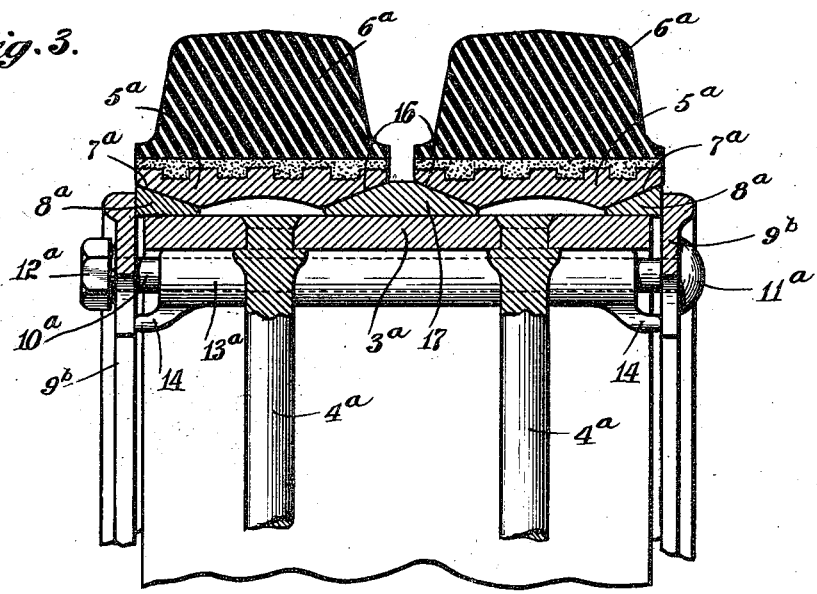
Fig. 3 is an axial sectional elevation through one side of the wheel showing my improved fastening means applied in connection with two detachable rims.

Referring to the drawings:

Referring more particularly to Figs. 1 and 2, 3 represents a portion of the fixed wheel rim of an all-metal wheel which rim is fixedly connected to the outer end of spokes 4 (one spoke only being shown) which spoke is connected as usual with the hub (not shown) of the wheel. 5 indicates a detachable or demountable rim provided in the present case with a solid rubber tire 6, which rim surrounds the fixed rim and is provided on its inner side at opposite edges with outwardly sloping surfaces 7, 7. 8, 8, indicate two axially movable fastening members for binding the detachable rim fixedly on the fixed rim, which members are in the form of wedging rings provided with outer peripheral sloping surfaces 8ª corresponding in slope to the sloping surfaces 7 on the detachable rim, and provided with inner cylindrical surfaces to seat flatly against the outer cylindrical surface of the fixed rim 3. 9, 9, indicate two clamping members, in the present instance in the form of clamping rings engaging at their outer peripheral edges against the edges of the wedging rings and extending inwardly some distance beyond the rim, these clamping rings being provided at intervals with openings to receive through bolts 10. The through bolts are provided at one end with heads 11 seated against the outer side of one of the rings and have screwed on their opposite ends clamping nuts 12 which when screwed up will act to draw the two clamping rings together in forcible engagement with the wedging rings 8. Associated with the through bolts respectively are fulcruming members 13 in the form of bars extending axially of the wheel and formed with openings through which the through bolts respectively extend, the upper sides of these bars being flattened as at 13ª and seated flatly against the inner face of the rim 3 to prevent them from shifting around on the bolts. The fulcruming bars are provided at their ends with fingers 14 which extend outwardly and bear against the clamping rings at points adjacent the inner edges of the rings and inward of the through bolts.

As a result of this construction it will be understood that the clamping rings are given a fulcruming support by the fingers 14 on the fulcruming bars, so that when the clamping nuts 12 are screwed up on the bolts, the two clamping rings being drawn toward each other will fulcrum on the fingers 14, whereby the wedging rings engaged by the clamping rings will be shifted axially toward each other, and the sloping surfaces on said rings coöperating with the sloping surfaces on the detachable rim, the latter will be wedged and bound firmly and fixedly in place on the fixed rim.

Figure 5:
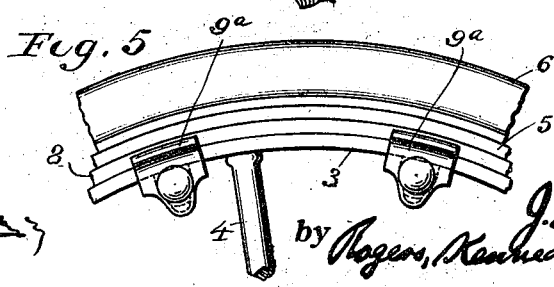
Fig. 5 is a side elevation of a portion of a wheel showing a modification of a detail.

As shown in Fig. 5, the clamping members instead of being in the form of rings as just described, may be in the form of separate and individual plates 9ª applied to the ends of the through bolts with the inner ends of the plates engaging the fingers 14 and their outer ends engaging the wedging rings 8. In this case, by screwing up the nuts on the through bolts the clamping plates will act similarly to the clamping rings in fulcruming on the fingers 14 and shifting the wedging rings axially.

Figure 4:
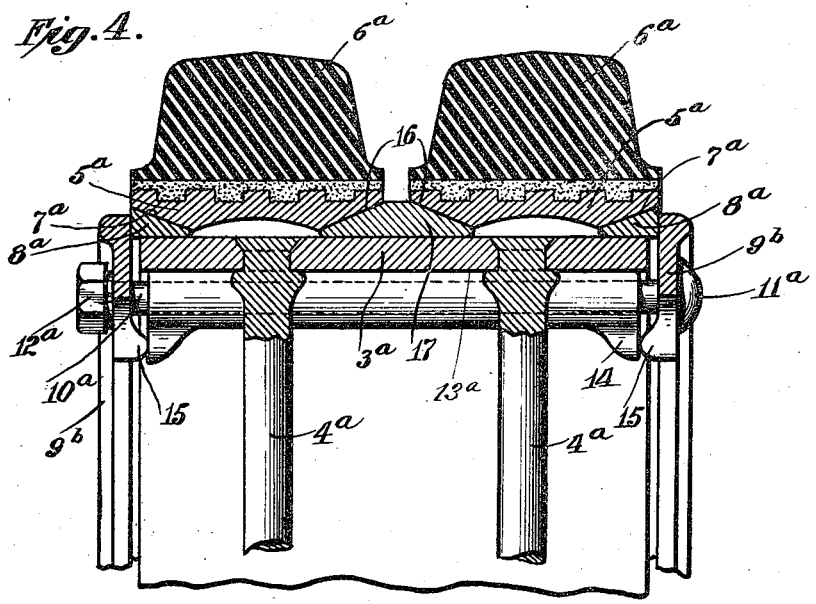
Fig. 4 is a similar view showing the invention in slightly modified form.

Instead of forming the fulcruming bars with the outwardly extending fingers 14 as shown in Fig. 1, the ends of these bars may be flat and the inner sides of the clamping members, the rings 9 of Fig. 1, or the plates 9ª of Fig. 5, may be formed with inwardly extending lugs 15 as shown in Fig. 4, bearing against the flat ends of the bars and constituting in effect fulcruming supports between the ends of the bars and clamping members.

In Figs. 3 and 4 my invention is shown in connection with a detachable rim comprising two individual rims 5ª, constituting a double or duplex tire.

In this case the rims 5ª surround the fixed rim 3ª side by side, and are formed on the inner sides at their adjacent edges with oppositely sloping surfaces 16 between which and the outer face of the fixed rim, a double wedge 17 is seated. At their outer edges on the inner sides the rims 5ª are formed with sloping surfaces 7ª between which and the outer face of the fixed rim are seated fastening members in the form of wedge shaped rings 8ª similar to the wedging rings 8 of Fig. 1. Clamping members in the form of rings 9ᵇ similar to the rings 9 of Fig. 1 are applied to the opposite sides of the wheel and engaged with the wedging rings 7ª, which clamping rings are connected by through bolts 10ª provided with heads 11ª and nuts 12ª, similar to the corresponding parts shown in Fig. 1, and arranged between the clamping rings and extending axially, are a series of fulcruming members 13ª having openings longitudinally therethrough, through which the respective clamping bolts extend. These fulcruming members may be either of the form shown in Fig. 1, where they are provided with outwardly extending fingers 14, or they may be of the form shown in Fig. 4 with flat ends engaged by inwardly extending fulcruming lugs 15 on the clamping members.

The operation of these parts to secure the two detachable rims 5ª in place is the same as in the first instance described in connection with Fig. 1, the tightening up of the clamping nuts 12ª serving to cause the clamping members to fulcrum on the fulcruming members, and thereby to shift the wedging rings axially and bind the two rims 5ª in firm engagement with the intermediate double wedged ring 17 and in fixed relation to the fixed rim 3ª.

It will be understood that in the application of the invention in securing a tire of the double type in place as shown in Fig. 3, the clamping members 9ᵇ instead of being in the form of rings may be in the form of clamping plates similar to the plates 9ª of Fig. 5.

By the provision of the special fulcruming members as described, the clamping members are given an effective fulcruming support at points a considerable distance inward of the fixed comparatively thin rim of the wheel, and I am therefore enabled to provide for the firm attachment of the detachable rim or rims in place, and for their ready removal from the fixed rim notwithstanding the fact that the usual comparatively thick wooden felly is not employed.

In the foregoing description and accompanying drawings I have disclosed my invention in the different forms which I prefer to adopt but it will be understood that the invention is not limited to the particular details and form of the parts shown, but that such forms may be variously modified and changed without departing from the spirit of my invention. Further it will be understood that the invention is not limited to any particular form of construction of the parts except in so far as such limitations are specified in the claims.

Having thus described my invention, what I claim is:

1. In combination with a fixed rim and connected spokes, a detachable rim surrounding the same, a wedging fastening member between the rims movable axially therebetween to bind the detachable rim on the fixed rim, and a locking device for the fastening member comprising a detachable fulcruming member disposed inward of the fastening member and independent of the fixed rim and spokes, a clamping member fulcruming on said fulcruming member and engaging the fastening member to shift it axially, and means acting on the clamping member to cause it to fulcrum and to shift the fastening member axially.

2. In combination with a fixed rim, a detachable rim surrounding the same, a wedging fastening member between the two rims shiftable axially therebetween to bind the detachable rim on the fixed rim, a plurality of separate fulcruming members disposed at intervals around the rim and inward of the fastening member, clamping means engaging the fastening member and fulcruming on the fulcruming members, and means acting on the clamping means to cause it to fulcrum and to shift the fastening member axially.

3. In combination with a fixed rim, a detachable rim surrounding the same, a fastening member between the two rims shiftable axially, a plurality of fulcruming members disposed inward of the fixed rim and provided with outer flattened surfaces bearing against the inner surface of the fixed rim; whereby the said fulcruming members will be prevented from turning, clamping means engaging the fastening member and fulcruming members respectively, and means acting on the clamping means to cause the same to fulcrum and to shift the fastening member axially.

4. In combination with a fixed rim, a detachable rim surrounding the same, a fastening member between the two rims movable axially to bind the detachable rim fixedly in place on the fixed rim, a clamping ring engaging said fastening member, a plurality of detachable fulcruming members engaged by the clamping ring inward of the point of engagement of said ring with the fastening member, and on which fulcruming members the clamping ring is adapted to fulcrum, and means acting on the clamping ring to cause it to fulcrum and shift the fastening member axially.

5. In combination with a fixed rim, a detachable rim surrounding the same, fastening members between the two rims movable axially to bind the detachable rim fixedly on the fixed rim, clamping rings engaging said fastening members, a plurality of separate fulcruming members independent of the fixed rim and disposed at intervals around the rim and inward of the fastening members and engaged by and on which said clamping rings are adapted to fulcrum, and means acting on the clamping rings to cause them to fulcrum on the said fulcruming members and shift the fastening members axially.

6. In combination with a fixed rim, a detachable rim surrounding the same, fastening members between the two rims shiftable axially to bind the detachable rim firmly on the fixed rim, a series of separate fulcruming members independent of the fixed rim and disposed at intervals around the rim and inward of the fastening members, clamping rings fulcruming on the fulcruming members and engaging the fastening members, and means acting on the clamping rings between their points of engagement with the fastening members and their fulcruming points, to cause the said rings to fulcrum and shift the fastening members axially.

7. In combination with a fixed rim, a detachable rim surrounding the same, wedging rings between the two rims movable axially to bind the detachable rim fixedly on the fixed rim, clamping rings engaging the wedging rings, a plurality of separate fulcruming members independent of the fixed rim and disposed at intervals around the rim and extending between the clamping rings and engaged by the same at points inward of the points of engagement of the clamping rings with the wedging rings, and means acting on the clamping rings between their points of engagement with the fulcruming members and wedging rings, and operating to cause the clamping rings to fulcrum and shift the wedging rings axially.

8. In combination with a fixed rim, a detachable rim surrounding the same, wedging rings between the two rims shiftable axially to bind the detachable rim firmly in place on the fixed rim, clamping rings at the ends of the fixed rim engaging the wedging rings, a plurality of separate fulcruming members independent of the fixed rim and extending axially between the clamping rings at intervals around the rim and engaging the rings at points inward of the points of engagement of the said rings with the wedging rings, and through bolts extending through the clamping rings between the points of engagement of said rings with the wedging rings and fulcruming members and extending also through the fulcruming members, and nuts applied to the bolts.

In testimony whereof, I have affixed my signature in presence of two witnesses.

JOSEPH L. HECHT.

Witnesses:
 ANDREW NEILSON,
 S. L. SAMPLE.